May 31, 1932.  C. W. ABBOTT  1,860,829
ELECTRICAL CONNECTER
Filed Sept. 19, 1928
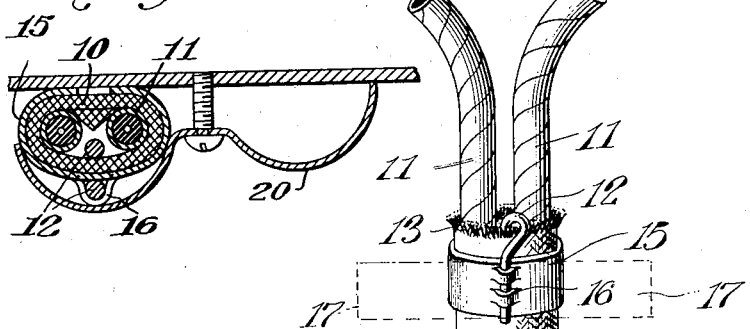
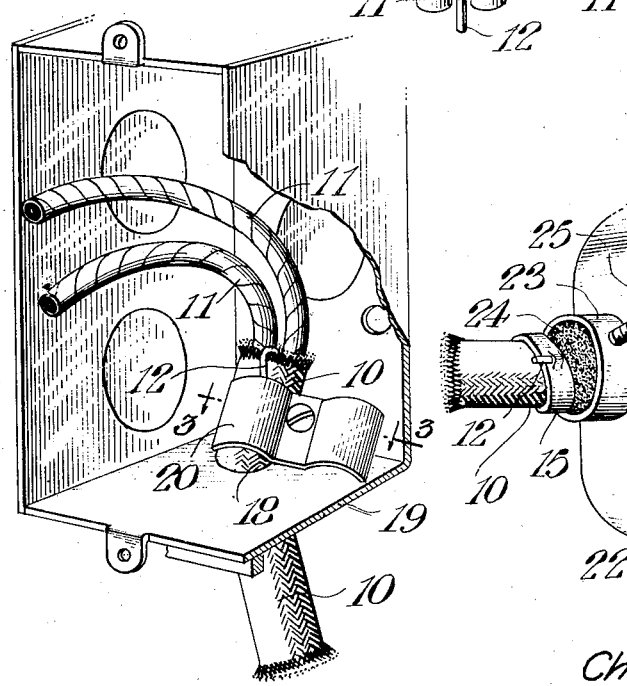
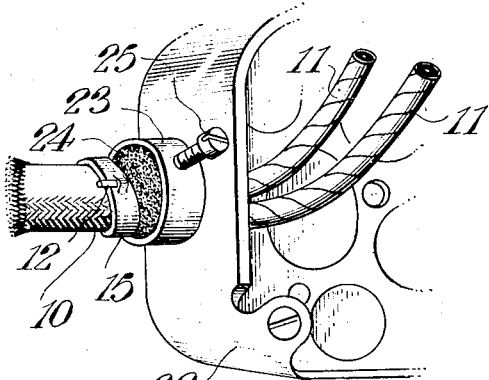
Inventor
Charles W. Abbott.
By his Attorneys
Emery, Booth, Janney & Varney.

Patented May 31, 1932

1,860,829

UNITED STATES PATENT OFFICE

CHARLES W. ABBOTT, OF ROME, NEW YORK, ASSIGNOR TO GENERAL CABLE CORPORATION, OF NEW YORK, N. Y., A CORPORATION OF NEW JERSEY

ELECTRICAL CONNECTER

Application filed September 19, 1928. Serial No. 306,813.

The present invention relates generally to a system of electrical distribution, more particularly to a connecter for a safety ground wire which may form a part of the electrical distribution system and to a method of making the connection by the connecter. The principal object of the invention is to provide a simple and effective connecter which may be easily installed. Other objects of the invention will become apparent hereinafter.

When buildings are wired with conductors enclosed within a flexible or rigid metallic conduit, such conduits are interconnected electrically as well as mechanically through junction and outlet boxes and also connected to ground. More particularly in the case of a non-metallic sheathed cable an additional conductor may be included in the cable to serve as a ground wire. Such an additional wire may, in the formation of the cable, be laid in one of the valleys between the separately insulated conductors and ordinarily the ground wire need have no individual insulation.

With such a cable it is desirable to provide a simple and efficient means of connecting this additional ground wire to junction and outlet boxes to effect the electrical interconnection of the several lengths of such ground wire and thus enable a single ground connection to be made for the entire system. The ground wire might be drawn along with the insulated conductors into a junction or outlet box and there secured by a screw-and-washer binding post or some similar device. A connection of this type, however, is difficult to make and where the ground wire extends into the junction box in this manner there is always danger that it will protrude against the live contacts of switches or other electrical appurtenances which are inserted into the box after it has been set and the cable installed. Furthermore workmen are inclined to be careless and cannot be relied upon to set up the screws sufficiently tight upon the ground wire to form a good connection. There is, therefore, an urgent need of providing some better way of making a connection between this ground wire and the junction box or other fixture, which preferably would not involve the entry of the ground wire into the interior of the box at all, or if permitting its entry into the box, would have it so disposed and secured therein that there would be no liability of its becoming loose or making contact with live terminals in the box. It is desirable that such a connection be formed of few and simple parts and that these parts shall be readily adaptable to standard fittings commonly employed.

One exemplary embodiment of the invention will now be described in connection with the accompanying drawings illustrating the same and wherein:

Fig. 1 is a view of a cable provided with a connecting member according to this invention;

Fig. 2 is a view of the ground connection completed on one type of fitting;

Fig. 3 is a cross sectional view taken on the line 3—3 of Fig. 2; and

Fig. 4 is a view similar to Fig. 2, but showing a different type of fitting.

Referring to Fig. 1, a cable of the type described in Letters Patent No. 1,520,680 is shown and generally denoted by the numeral 10. Such cable includes a plurality of insulated conductors 11, and herein is provided with a ground wire 12 laid in one of the valleys between the conductors and within a non-metallic sheath 13 enclosing the whole. The sheath 13 is removed for a certain distance back from the end of the cable according to the common practice in preparing the cable for attachment at junction or outlet boxes. Hereinafter the term junction box will be used to include both junction and outlet boxes.

The ground wire 12 is pulled out from the assembly and attached to a ground connecter 15. The attachment of the ground wire to this connecter may be made in various ways but as shown the connecter, which is formed preferably of an elongated strip of soft metal, is slitted intermediate its ends to form loops 16 providing apertures through which the ground wire may be threaded. The end portions 17 of the strip are sufficiently long and pliable to permit them to be bent about the cable to hold the ground wire in place and form a sleeve or strap over the end of the sheath of the cable.

As shown in Figs. 2 and 3, the cable with the sleeve in place may be threaded through one of the knockout openings 18 of a junction box 19 until the sleeve comes beneath the clamp 20 which is then screwed down to securely hold the cable and form electrical connection with the sleeve and ground wire as well as mechanical connection of the cable to the box.

In Fig. 4 a different type of connection is shown wherein the junction box 22 has a coupling 23 entering a knockout opening and secured within the box by a nut or other suitable means (not shown). The cable is threaded through this coupling until the connecter 15 comes beneath the crescent-shaped filler 24, whereupon the set screw 25 is tightened to clamp the cable to the box and form a good electrical connection with the ground wire and connecter as well as a good mechanical connection between cable and box.

The method of making this connection will be readily apparent from the drawings and the preceding description. The cable 10 is cut off to proper length at the junction box and a portion of the sheath 13 removed from this end to expose the insulated conductors 11 and the bare ground wire 12. The connecter 15 is threaded upon the ground wire 12 until the connecter is close against the end of the sheath, whereupon the ground wire is bent back to place the middle portion of the connecter over the end of the cable sheath. In lieu of threading on the connecter and then bending back the wire, it is obvious that the wire might first be bent back and the connecter then threaded on. At this stage, if desired, the loops 16 may be crushed down upon the ground wire to securely grip it. The ends 17 of the connecter are then bent around the cable to form a sleeve on the cable over the end of the sheath. This assembly is then inserted into the junction box until the connecter is in position to be clamped and the clamp of whatever kind employed is then brought up on it. This clamping action will still further crush the loops 16 upon the ground wire to grip it and form a good electrical connection. In addition the loops and the raised wire lying on the cable provide projections which press tightly against the surrounding metal parts under the action of the clamp and thus insure a good electrical contact.

When the end of the cable is provided with a sleeve or strap connecter of this sort grounding may be effected in the same manner as if a metallic sheathed cable were employed. For this reason it is not necessary to discuss further types of junction boxes or similar devices with which the grounding connection may be made since these are well understood in the art in connection with the use of the metal sheathed cables. The strap may be formed of material somewhat thicker or more substantial than indicated above and this strap may directly serve with the use of necessary screws or the like to clamp the cable to an adjacent metal surface to provide mechanical and electrical connection.

Only one form of the invention has been particularly described herein but it will be understood that various changes and modifications may be made within the spirit of the invention as expressed in the appended claims.

I claim as my invention:—

1. In combination, an electrical cable having a non-metallic sheath and a running ground wire provided with a projecting end, a ground connecter of bendable metal attached to said wire and bent around said cable over its sheath, and cable securing means embracing the cable and surrounding connecter.

2. The method of grounding a non-metallic sheathed cable having an enclosed ground wire, which comprises, unsheathing the end of the wire, threading the wire into a loop formed on a soft metal strip, turning the wire and strip back over the end of the cable sheath, bending the ends of the strip around the cable to form a sleeve and binding the cable with the sleeve beneath a clamp to crush the loop down upon the wire and form an electrical connection with said clamp.

3. The combination with an electric cable having a non-metallic sheath and a ground wire located within said sheath, of a junction box, a ground connecter surrounding said sheath and secured to said ground wire, and a clamping strap engaging said connecter so as to clamp said cable to said box and electrically connect said connecter to said box.

4. The combination with a junction box of a non-metallic sheathed cable having a ground wire, a ground wire connecter embracing said sheath and connected to said ground wire and clamping means for securing said cable to said box and co-operating with said connecter to electrically connect the same to said box.

In testimony whereof, I have signed my name to this specification this 13th day of September, 1928.

CHARLES W. ABBOTT.